US012689139B2

(12) United States Patent
Yoshida et al.

(10) Patent No.: US 12,689,139 B2
(45) Date of Patent: Jul. 21, 2026

(54) GLASS PLATE MODULE

(71) Applicant: NIPPON SHEET GLASS COMPANY, LIMITED, Tokyo (JP)

(72) Inventors: Minoru Yoshida, Tokyo (JP); Junichi Tokiwa, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 834 days.

(21) Appl. No.: 17/428,802

(22) PCT Filed: Jan. 31, 2020

(86) PCT No.: PCT/JP2020/003675
§ 371 (c)(1),
(2) Date: Aug. 5, 2021

(87) PCT Pub. No.: WO2020/162354
PCT Pub. Date: Aug. 13, 2020

(65) Prior Publication Data
US 2022/0131289 A1       Apr. 28, 2022

(30) Foreign Application Priority Data
Feb. 8, 2019    (JP) ................................. 2019-021440

(51) Int. Cl.
H01R 12/53          (2011.01)
B23K 1/19           (2006.01)
(Continued)

(52) U.S. Cl.
CPC .............. H01R 12/53 (2013.01); B23K 1/19 (2013.01); B60J 1/001 (2013.01); B60J 1/002 (2013.01);
(Continued)

(58) Field of Classification Search
None
See application file for complete search history.

(56) References Cited

U.S. PATENT DOCUMENTS 4,246,467 A * 1/1981 Boaz ........................ H05B 3/84
219/541
4,425,021 A * 1/1984 Nicolino ................ H01R 13/04
439/874
(Continued)

FOREIGN PATENT DOCUMENTS

CN      101052279 A     10/2007
CN      105939809 A      9/2016
(Continued)

OTHER PUBLICATIONS

Chinese Office Action and Search Report for Chinese Application No. 202080013014.0 dated Apr. 25, 2022, with English translation.
(Continued)

*Primary Examiner* — Thien S Tran
(74) *Attorney, Agent, or Firm* — Birch, Stewart, Kolasch & Birch, LLP

(57)          ABSTRACT
A glass plate module according to the present invention includes: a glass body; an electrical conductor laminated on the glass body; at least one connection terminal fixed to the conductive layer, and formed of a conductive material; and a lead-free solder for fixing the connection terminal to the conductive layer, and the connection terminal includes a base portion, at least one installation portion coupled to the base portion, and fixed to the conductive layer via the lead-free solder, a power supply portion coupled to the base portion, and to be connected to a cable for supplying power to the conductive layer, and a connection portion that is disposed between the base portion and the power supply
(Continued)

portion, and that connects the connection portion to the base portion in a bendable manner.

15 Claims, 14 Drawing Sheets

(51) Int. Cl.

| | |
|---|---|
| *B60J 1/00* | (2006.01) |
| *C03C 17/06* | (2006.01) |
| *H01Q 1/12* | (2006.01) |
| *H01R 4/18* | (2006.01) |
| *H01R 4/58* | (2006.01) |
| *H01R 12/57* | (2011.01) |
| *H01R 43/02* | (2006.01) |
| *H05B 3/06* | (2006.01) |
| *H05B 3/86* | (2006.01) |

(52) U.S. Cl.
CPC ............. *C03C 17/06* (2013.01); *H01R 12/57* (2013.01); *H01R 43/0256* (2013.01); *H05B 3/06* (2013.01); *H05B 3/86* (2013.01); *H01Q 1/1278* (2013.01); *H01R 4/187* (2013.01); *H01R 4/58* (2013.01); *H05B 2203/016* (2013.01)

(56) References Cited

U.S. PATENT DOCUMENTS

| | | | | |
|---|---|---|---|---|
| 2004/0237302 | A1 | 12/2004 | Antaya et al. | |
| 2009/0233119 | A1* | 9/2009 | Lyon ........................ | H01R 4/02 |
| | | | | 428/631 |
| 2009/0277671 | A1* | 11/2009 | Hahn ..................... | H01R 4/023 |
| | | | | 228/136 |
| 2014/0182932 | A1 | 7/2014 | Cholewa et al. | |
| 2016/0006112 | A1* | 1/2016 | Kagaya ................... | H01Q 9/16 |
| | | | | 343/712 |
| 2018/0083339 | A1* | 3/2018 | Werner ................... | H01Q 1/02 |
| 2018/0154868 | A1* | 6/2018 | Tokiwa ................. | H01R 12/57 |
| 2018/0175857 | A1 | 6/2018 | Weber et al. | |
| 2018/0200997 | A1 | 7/2018 | Tokiwa | |
| 2018/0297331 | A1* | 10/2018 | Gahagan ................. | B60J 1/001 |
| 2020/0185839 | A1 | 6/2020 | Cholewa et al. | |
| 2024/0042737 | A1* | 2/2024 | Morita ..................... | B32B 7/12 |
| 2024/0042739 | A1* | 2/2024 | Morita ................. | C03B 35/181 |
| 2024/0150216 | A1* | 5/2024 | Rapenne ................ | C03B 33/04 |

FOREIGN PATENT DOCUMENTS

| | | | |
|---|---|---|---|
| CN | 107925170 A | 4/2018 | |
| EP | 3 312 937 A1 | 4/2018 | |
| EP | 3 324 486 A1 | 5/2018 | |
| JP | 56-22075 A | 3/1981 | |
| JP | 57-197761 A | 12/1982 | |
| JP | 7-132781 A | 5/1995 | |
| JP | 2010-500703 A | 1/2010 | |
| JP | 2014-96198 A | 5/2014 | |
| JP | 2014-519149 A | 8/2014 | |
| JP | 2016-64444 A | 4/2016 | |
| JP | 2017-22047 A | 1/2017 | |
| JP | 2018-537697 A | 12/2018 | |
| JP | 2019-212494 A | 12/2019 | |
| WO | WO-2016177653 A1 * | 11/2016 | ............... H01Q 1/02 |
| WO | WO 2016/204247 A1 | 12/2016 | |

OTHER PUBLICATIONS

Extended European Search Report for European Application No. 20753173.2, dated Nov. 9, 2022.

Japanese Office Action for Japanese Application No. 2020-571162, dated Sep. 5, 2023, with an English translation.

International Search Report (PCT/ISA/210) issued in PCT/JP2020/003675, dated Mar. 17, 2020.

Written Opinion of the International Searching Authority (PCT/ISA/237) issued in PCT/JP2020/003675, dated Mar. 17, 2020.

Japanese Office Action dated Nov. 21, 2023 for Application No. 2020-571162 with an English translation.

* cited by examiner

Up

Right ◄────────►Left

Down

GLASS PLATE MODULE

TECHNICAL FIELD

The present invention relates to a glass plate module that is mounted to a window frame of a structure.

BACKGROUND ART

For example, Patent Literature 1 discloses a connection terminal that is connected to an electrical conductor of a glass plate of an automobile. A cable or the like is connected to such a connection terminal, and electric power is supplied to the electrical conductor via the connection terminal.

CITATION LIST

Patent Literature

Patent Literature 1: JP 2014-519149A

SUMMARY OF INVENTION

Technical Problem

Incidentally, a connection terminal such as that described above is fixed to an electrical conductor via lead-free solder. However, since lead-free solder is hard compared with leaded solder, there is a risk that if the connection terminal catches on something, or the cable connected to the connection terminal is suddenly pulled, stress will concentrate on the place where the connection terminal is connected to the electrical conductor, and failures such as the connection terminal becoming detached will occur.

The present invention was made in order to solve the foregoing problem, and it is an object thereof to provide a glass plate module that can suppress failures such as a connection terminal being detached, etc., even when an external force acts on the connection terminal.

Solution to Problem

A glass plate module according to the present invention includes a glass body; an electrical conductor laminated on the glass body; at least one connection terminal fixed to the electrical conductor, and formed of a conductive material; and a lead-free solder for fixing the connection terminal to the electrical conductor, and the connection terminal includes a base portion, at least one installation portion coupled to the base portion, and fixed to the electrical conductor via the lead-free solder, a power supply portion to be connected to a cable for supplying power to the electrical conductor, and a connection portion that is disposed between the base portion and the power supply portion, and that connects the power supply portion to the base portion in a bendable manner.

The above-described glass plate module can include a pair of installation portions.

In the above-described glass plate module, the pair of installation portions can be disposed on opposite sides to each other so as to sandwich the base portion.

In the above-described glass plate module, the connection portion may be configured to be more deformable than the base portion.

In the above-described glass plate module, the connection portion can be formed of copper-zinc alloy.

In the above-described glass plate module, at least one protrusion can be formed on a surface of the installation portion that is opposed to the electrical conductor via the lead-free solder.

In the above-described glass plate module, the electrical conductor can be formed by at least one heating wire.

In the above-described glass plate module, the electrical conductor can be formed by at least one antenna.

In the above-described glass plate module, the electrical conductor can be formed by at least one light control body or light emitting body.

In the above-described glass plate module, the glass body can be formed of laminated glass that includes an outer glass plate, an inner glass plate, and an intermediate film disposed between the outer glass plate and the inner glass plate.

In the above-described glass plate module, the electrical conductor can be disposed between the outer glass plate and the inner glass plate, a notch can be formed in an end edge of the inner glass plate, and the connection terminal can be fixed, via the lead-free solder, to the electrical conductor that is exposed to the outside due to the notch.

In the above-described glass plate module, the outer glass plate can be formed of non-tempered glass.

In the above-described glass plate module, the electrical conductor can be formed of printed silver.

In the above-described glass plate module, the lead-free solder can be a indium-based lead-free solder.

In the above-described glass plate module, a melting point of the lead-free solder can be 150° C. or lower.

Advantageous Effects of Invention

According to the glass plate module of the present invention, even when an external force acts on a connection terminal, it is possible to suppress failures such as the connection terminal being detached, etc.

DESCRIPTION OF EMBODIMENTS

Figure 1:
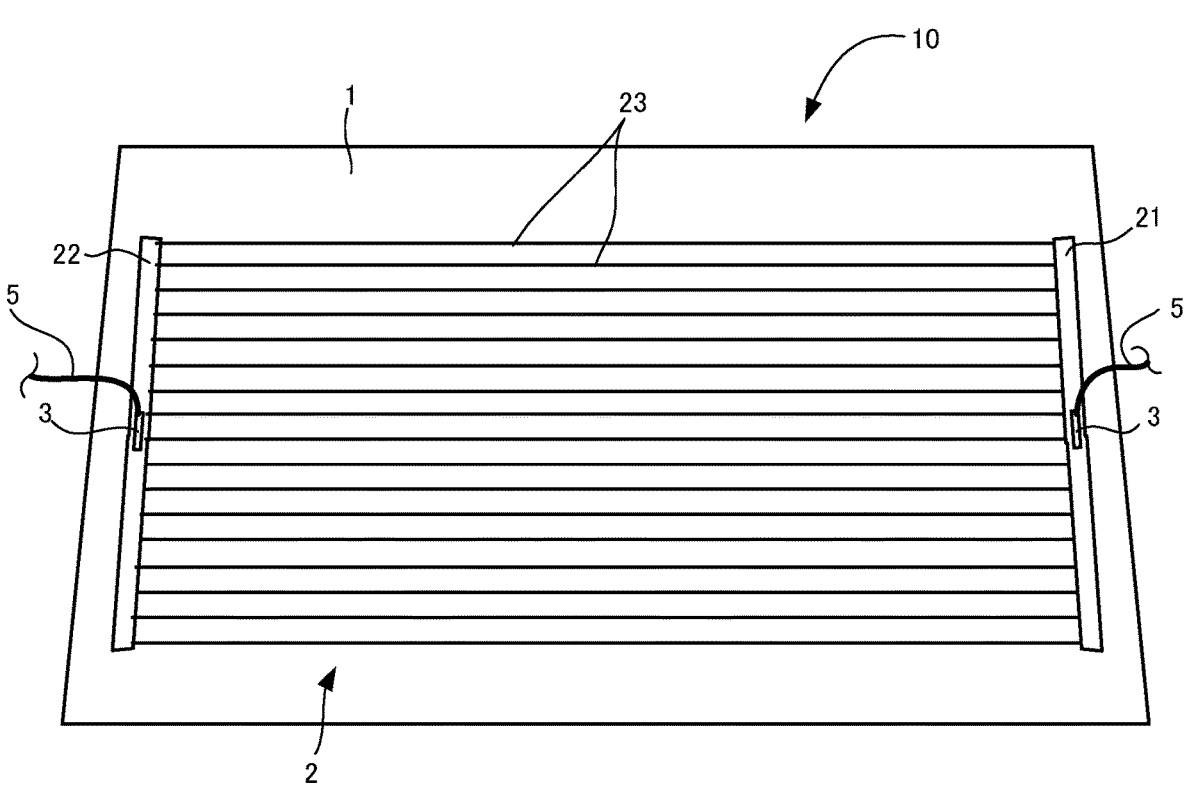
FIG. 1 is a plan view of a glass plate module according to an embodiment of the present invention.

An embodiment of a glass plate module according to the present invention will be described below with reference to the drawings. FIG. 1 is a plan view of this glass plate module. As shown in FIG. 1, this glass plate module 10 is to be fitted in a window frame of an automobile. Specifically, this glass plate module 10 has a glass plate 1, a defogger 2 (electrical conductor) laminated on this glass plate 1, and a pair of connection terminals 3 that are attached to this defogger 2 using lead-free solder 4. Cables 5 for supplying electric power that extend from inside the automobile are respectively attached to the connection terminals 3, and an electric current supplied from the cables 5 is supplied to the defogger via the connection terminals 3. The constituent members will be described below.

1. Glass Plate

A known automotive glass plate can be used as the glass plate 1. For example, heat absorbing glass, regular clear glass or green glass, or UV green glass may be used as the glass plate 1. However, the glass plate 1 as described above is required to attain visible light transmittance in line with the safety standards of the country in which the automobile is to be used. For example, an adjustment can be made such that solar absorptance, visible light transmittance and the like satisfy the safety standards. An example of the composition of clear glass and an example of the composition of heat absorbing glass are shown below.

Clear Glass $SiO_2$: 70 to 73 mass %

$Al_2O_3$: 0.6 to 2.4 mass %

CaO: 7 to 12 mass %

MgO: 1.0 to 4.5 mass %

$R^2O$: 13 to 15 mass % (R is an alkali metal)

Total iron oxide ($T-Fe_2O_3$) in terms of $Fe_2O_3$: 0.08 to 0.14 mass %

Heat Absorbing Glass

With regard to the composition of heat absorbing glass, a composition obtained based on the composition of clear glass by setting the ratio of the total iron oxide ($T-Fe_2O_3$) in terms of $Fe_2O_3$ to 0.4 to 1.3 mass %, the ratio of $CeO_2$ to 0 to 2 mass %, and the ratio of $TiO_2$ to 0 to 0.5 mass % and reducing the skeletal components of glass (mainly $SiO_2$ and $Al_2O_3$) by an amount corresponding to the increases in $T-Fe_2O_3$, $CeO_2$, and $TiO_2$ can be used, for example.

Note that the type of the glass plate 1 is not limited to clear glass or heat absorbing glass, and can be selected as appropriate according to the embodiment. For example, the glass plate 1 may be a resin window made of acrylic resin, polycarbonate resin, or the like.

In addition, the thickness of the glass plate 1 according to this embodiment is not particularly limited. However, from the viewpoint of weight reduction, the thickness of the glass plate 1 may be set in a range of 2.2 to 5.1 mm, a range of 2.4 to 3.8 mm, or a range of 2.7 to 3.2 mm. Furthermore, the thickness of the glass plate 1 may be set to be 3.1 mm or smaller, 2.0 mm or smaller, or 1.6 mm or smaller.

In addition, the glass plate 1 as described above may be laminated glass having an interlayer made of resin or the like sandwiched by a plurality of glass plates, instead of being a single glass plate. The thicknesses of the glass plates that form the laminated glass are not particularly limited, but for example, the thickness of one glass plate and the thickness the other glass plate can be respectively set to 1.6 mm and 2.0 mm. In addition, the thickness of the one glass plate can be set to 0.3 mm. Accordingly, the thickness of each glass plate can be set within a range of 0.2 to 5.1 mm as appropriate.

2. Defogger

Next, the defogger 2 will be described. As shown in FIG. 1, the defogger 2 has a pair of busbars, namely a first busbar 21 and a second busbar 22 for supplying electric power, which extend in the up-down direction along two side edges of the glass plate 1. Between the busbars 21 and 22, a plurality of heating wires 23 extending in the horizontal direction are arranged in parallel at a predetermined interval.

In addition, an electric current is supplied from the connection terminal 3 that is attached to the first busbar 21, and the connection terminal that is attached to the second busbar 22 is grounded via the cable 5. Due to this configuration, when an electric current is supplied to the defogger 2, defogging heat is generated in the heating wires 23. Note that the busbars 21 and 22 and the heating wires 23 are formed by printing electroconductive silver paste onto the surface of the glass plate 1 and firing the silver paste, for example. However, the material of the defogger 2 is not limited to this silver paste, and can be selected as appropriate.

3. Connection Terminals

Figure 2:
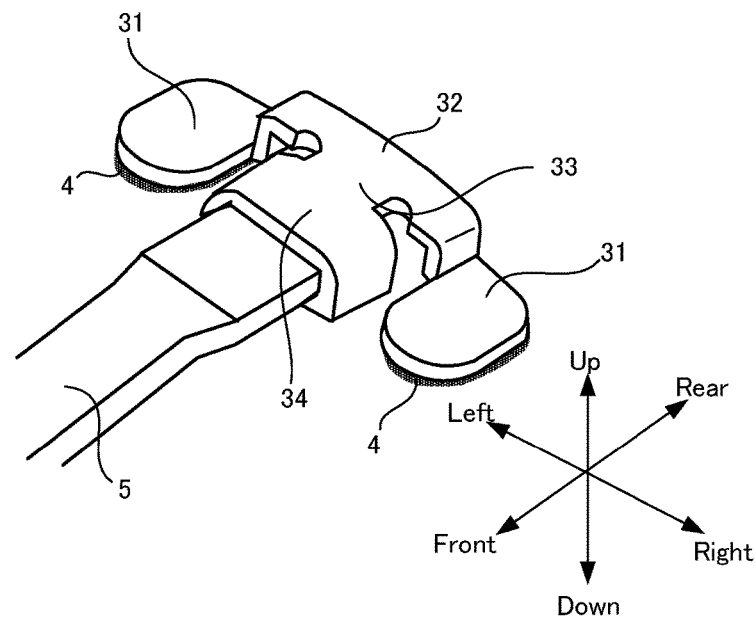
FIG. 2 is a perspective view of a connection terminal for use in the glass plate module in FIG. 1.
Figure 3:
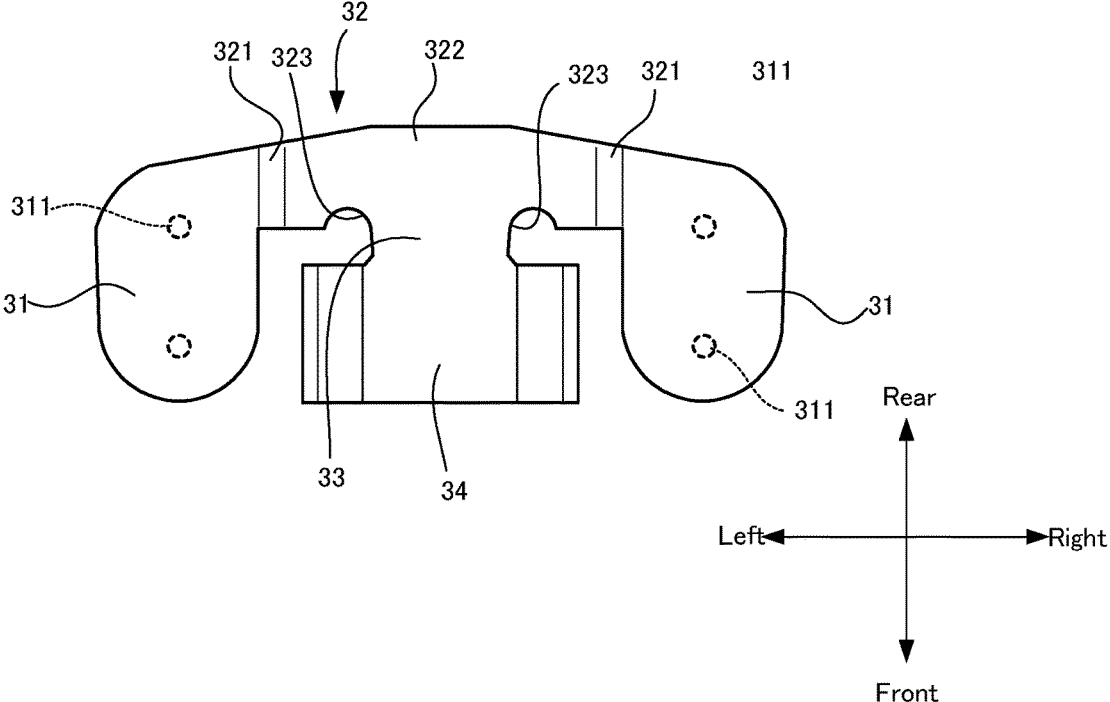
FIG. 3 is a plan view of FIG. 2.
Figure 4:
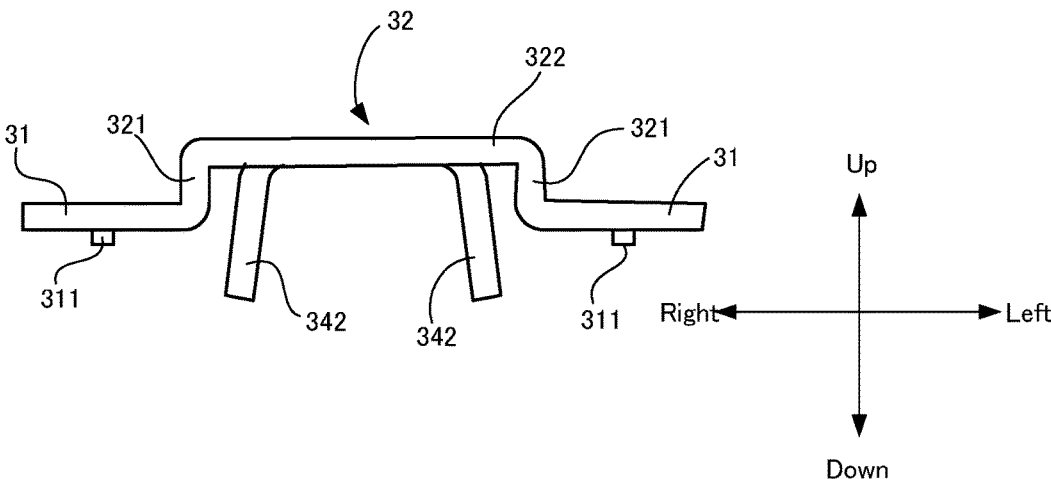
FIG. 4 is a rear view of FIG. 2.

Next, the connection terminals 3 will be described with reference to FIGS. 2 and 3. FIG. 2 is a perspective view of a connection terminal with a cable connected thereto, FIG. 3 is a plan view of the connection terminal before the cable is connected, and FIG. 4 is a rear view of the connection terminal. For convenience of description, the following will be described based on the directions shown in FIGS. 2 to 4.

As shown in FIGS. 2 to 4, each connection terminal 3 according to this embodiment includes a pair of installation portions 31, a base portion 32, a connection portion 33, and a power supply portion 34, and these are, for example, formed integrally by bending an electrically conductive material such as a sheet-like metal. The material of each connection terminal 3 is not particularly limited as long as it is an electrically conductive material, but a material having high repetitive bending strength such as will be described later is preferable, and, for example, copper-zinc alloy, tough pitch steel (C1100R), yellow brass (C2600), or copper alloy (NB-109) is preferably adopted.

The installation portions 31 are respectively installed on the busbars 21 and 22 of the defogger 2, and are each formed in a plate-like shape. The installation portions 31 are formed in a rectangular shape as a whole, and corners thereof are formed in a circular-arc shape. In addition, the lower surfaces of the installation portions 31 are fixed to the busbar 21 or 22 via the lead-free solder 4 to be described later. Note that the installation portions 31 each have a shape that has curved corners, which suppresses stress concentration to be described later.

Two protrusions 311 are formed on the lower surface of each of the installation portions 31, and, as will be described later, a gap is formed between the installation portion 31 and the busbar 21 or 22 due to these protrusions 311, and the lead-free solder 4 is disposed to fill the gap.

The two installation portions 31 are coupled by the base portion 32. To be more specific, the base portion 32 includes a pair of standing portions 321 standing from rear end portions of the side edges of the installation portions 31, and a main body portion 322 that extends in the horizontal direction so as to connect the standing portions 321, and the base portion 32 is formed to be U-shaped as a whole when viewed from the front. Also, the connection portion 33 extends forward from the front end of the main body portion 322, and furthermore the power supply portion 34 extending in a band-like manner in the right-left direction is connected to the front end of the connection portion 33.

The width in the right-left direction of the connection portion 33 is smaller than that of the main body portion 322. In addition, in a portion in which the main body portion 322 is connected to the connection portion 33, notches 323 of a semicircular shape are formed at positions corresponding to the two ends of the connection portion 33.

Figure 5:
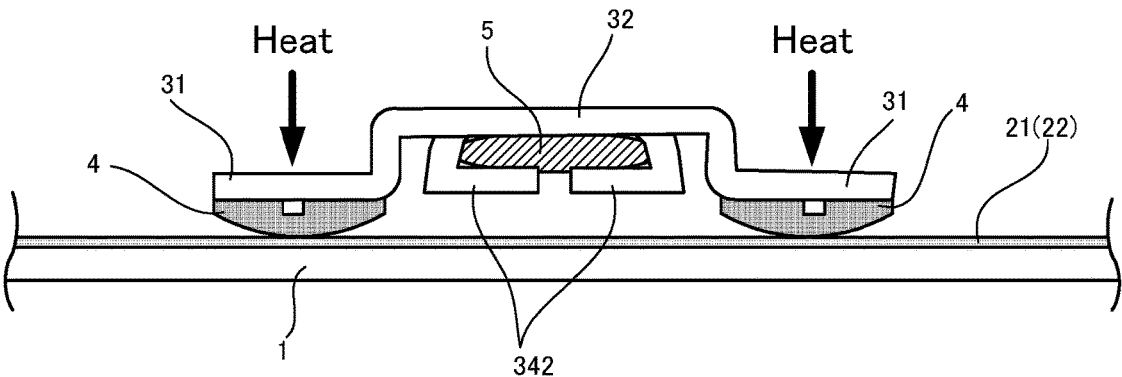
FIG. 5 is a rear view showing a method for attaching the connection terminal shown in FIG. 2 to a glass plate.

As shown in FIGS. 3 and 4, before the cable 5 is connected thereto, the power supply portion 34 includes a rectangular supporting portion 341 connected to the connection portion 33 and a pair of extending portions 342 that extend downward from the two sides of this supporting portion 341. The width in the right-left direction of the supporting portion 341 is larger than that of the connection portion 33. Also, as shown in FIG. 5 to be described later, as a result of the supporting portion 341 and the pair of extending portions 342 surrounding the cable 5, and being crimped, the cable 5 is fixed to the power supply portion 34.

4. Solder

The lead-free solder 4 is not particularly limited, and indium-based, lead-based, bismuth-based, or tin-silver based lead-free solder can be used. Particularly, indium-based and lead-based lead-free solders are soft materials compared with tin-silver based lead-free solder, for example, and thus it is possible to suppress breakage of the glass plate due to residual stress. In addition, in order to mitigate stress concentration, soft lead-free solder such as indium-based lead-free solder that has a melting point of 150° C. or lower is preferably used.

5. Attachment of Connection Terminals

Figure 6:
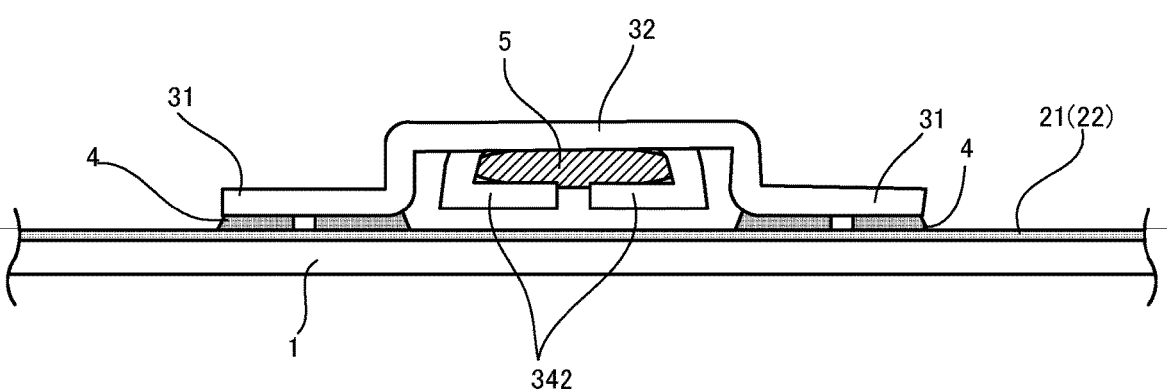
FIG. 6 is a rearview showing a state where the connection terminal shown in FIG. 2 is attached to a glass plate.

Next, a method for attaching each connection terminal 3 will be described with reference to FIGS. 5 and 6. First, the cable 5 is fixed to the power supply portion 34 as a result of the cable 5 being disposed between the extending portions 342 of the power supply portion 34, and both the extending portions 342 being crimped, as shown in FIG. 5. Accordingly, the cable 5 is disposed below the base portion 32. Note that the cable 5 is covered with a non-conductive member such as rubber except for a portion thereof that is connected to the power supply portion 34. Next, the lead-free solder 4 is applied to the lower surfaces of the installation portions 31.

Next, the connection terminal 3 that has been prepared as described above is fixed to the busbar 21 or 22. First, as shown in FIG. 5, the lead-free solder 4 is disposed on the busbar 21 or 22. Subsequently, the installation portions 31 of the connection terminal 3 are heated on the upper surface side thereof. Thus, the heat is conducted to the lead-free solder 4 via the installation portions 31, and the lead-free solder 4 is melted. Then, as shown in FIG. 6, as the lead-free solder 4 solidifies, the installation portions 31 are fixed to the busbar 21 or 22.

6. Characteristics

As described above, with the glass plate module 10 according to this embodiment, the following effects can be obtained.

Figure 7:
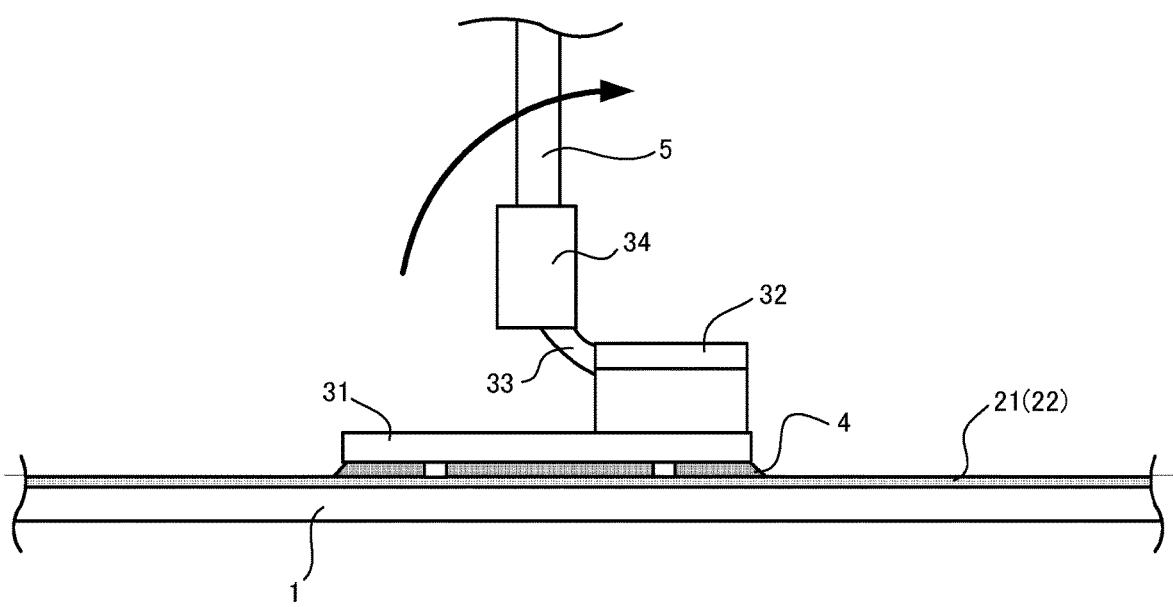
FIG. 7 is a side view showing a state where, when the connection terminal shown in FIG. 2 is attached to a glass plate, a cable is caused to exert a force on the connection terminal.
Figure 8:
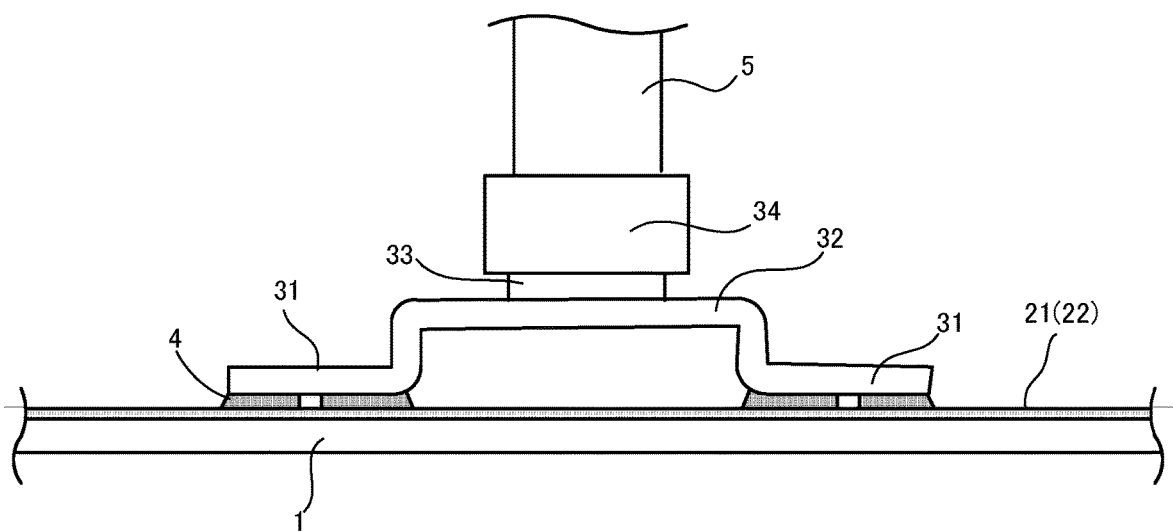
FIG. 8 is a rear view of FIG. 7.

(1) As shown in FIGS. 7 and 8, for example, when the cable 5 rotates, and a force is applied perpendicularly to the glass plate 1, there is a risk that stress will concentrate on a portion of the installation portions 31 so as to cause the installation portions 31 to be detached from the busbar 21 or 22, or cause the installation portions 31 to be detached together with the busbar 21 or 22 and the glass plate 1, and accordingly, there is a risk that the connection terminal 3 will separate from the busbar 21 or 22.

In view of this, in this embodiment, a configuration is adopted in which the connection portion 33 whose width is small is provided between the power supply portion 34 and the base portion 32, and when the cable 5 rotates along with the power supply portion 34, the connection portion 33 bends relative to the base portion 32. Thus, concentration of a force on the installation portions 31 is suppressed, and as a result, it is possible to prevent the installation portions 31 from being detached from the busbar 21 or 22 and the glass plate 1.

In addition, the lead-free solder 4 that has a low melting point such as an indium-based lead-free solder is soft compared with lead-free tin-silver based lead-free solder, for example, and thus, when a force such as that described above is applied, it is possible to mitigate the force that acts on the busbar 21 or 22 from the installation portions 31 via the lead-free solder 4, and to further inhibit the connection terminals 3 from being detached. Note that, for example, when the defogger is mistakenly turned on under high temperature such as that in a desert or beach in midsummer, there is the possibility that the temperature of such lead-free solder 4 that has a low melting point will rise to near the melting point, and the adhesive force of the solder will slightly decrease. In contrast, tin-silver based lead-free solder is hard compared with indium-based lead-free solder, and has a low stress mitigation effect, but has a high melting point, and thus the above-described decrease in the adhesive force does not occur when used under high temperature.

(2) As shown in FIGS. 2 and 3, the notches 323 that have a circular-arc shape are formed in portions of the base portion 32 that are connected to the connection portion 33. Thus, the length of the connection portion 33 in the front-rear direction is made materially larger due to the notches 323. Therefore, the connection portion 33 tends to receive a force, and bends more easily. As a result, it is possible to further suppress concentration of a force on the installation portions 31, and, as a result, it is possible to further prevent the installation portions 31 from being detached from the busbar 21 or 22 and the glass plate 1.

(3) The standing portions 321 are provided in the base portion 32 of each connection terminal 3 according to this embodiment, but thereby a gap can be formed between the main body portion 322 of the base portion 32 and the installation portions 31. Therefore, the power supply portion 34 can be disposed in this gap, and the cable 5 can be disposed below the main body portion 322. Accordingly, it is possible to suppress the protrusion height of the connection terminals 3 from the glass plate 1, and to keep the connection terminals 3 from coming into contact with a worker, a working tool, and the like. In addition, the power supply portion 34 does not protrude from the upper surface of the base portion 32, and thus the connection terminals 3 can have a compact structure.

(4) The pair of installation portions 31 are disposed on two sides of the power supply portion 34 so as to sandwich the power supply portion 34 from the right and left. Accordingly, it is possible to distribute, in the right and left direction, a force that acts on the power supply portion 34 (particularly moment of rotation to be described later), and to weaken the force that acts on the installation portions 31.

(5) The protrusions 311 are formed on the lower surfaces of the installation portions 31, and thus a gap can be formed between the installation portions 31 and the busbar 21 or 22 due to these protrusions 311. Moreover, the lead-free solder 4 is disposed in this gap, and thus it is possible to uniformize the thickness of the lead-free solder 4. Therefore, it is possible to uniformize the bond strength within the surfaces of the installation portions 31.

7. Variations

One embodiment of the present invention has been described above, but the present invention is not limited to the above embodiment, and various modifications can be made without departing from the gist of the invention. In addition, a plurality of variations described as follows can be combined as appropriate.

1. In the above embodiment, as a result of the width of the connection portion 33 being made smaller than that of the main body portion 322 of the base portion 32, and the notches 323 being formed, the length of the connection portion 33 in the front-rear direction is made materially longer and the connection portion 33 is made to bend more easily, but, other than these, various configurations for easy bending can be provided in the connection portion 33. It is possible to realize various configurations for making the connection portion 33 bend more easily by making the connection portion 33 deform more easily than the base portion 32, for example, as a result of the thickness of the connection portion 33 being made smaller than that of the base portion 32, the connection portion 33 being provided in advance with a tendency to bend, or the material that forms the connection portion 33 being changed to a softer material than the base portion 32.

2. In the above embodiment, each connection terminal 3 is integrally formed of one material, but can be formed of a plurality of materials. As described above, it is also possible to form only the connection portion 33 using a different material.

Figure 9:
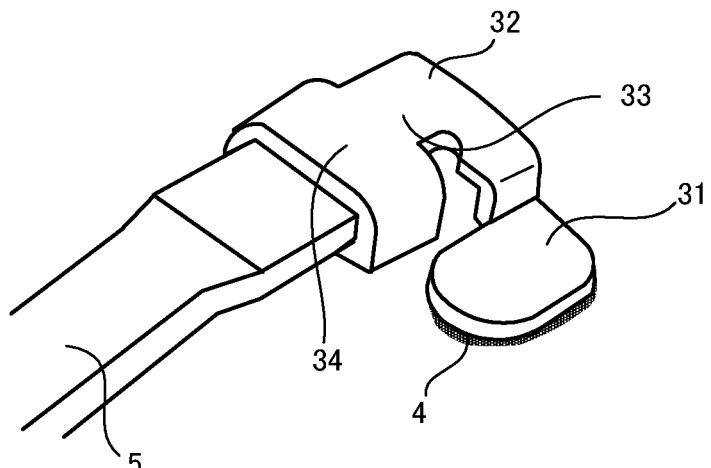
FIG. 9 is a perspective view showing another example of a connection terminal according to the present invention.
Figure 10:
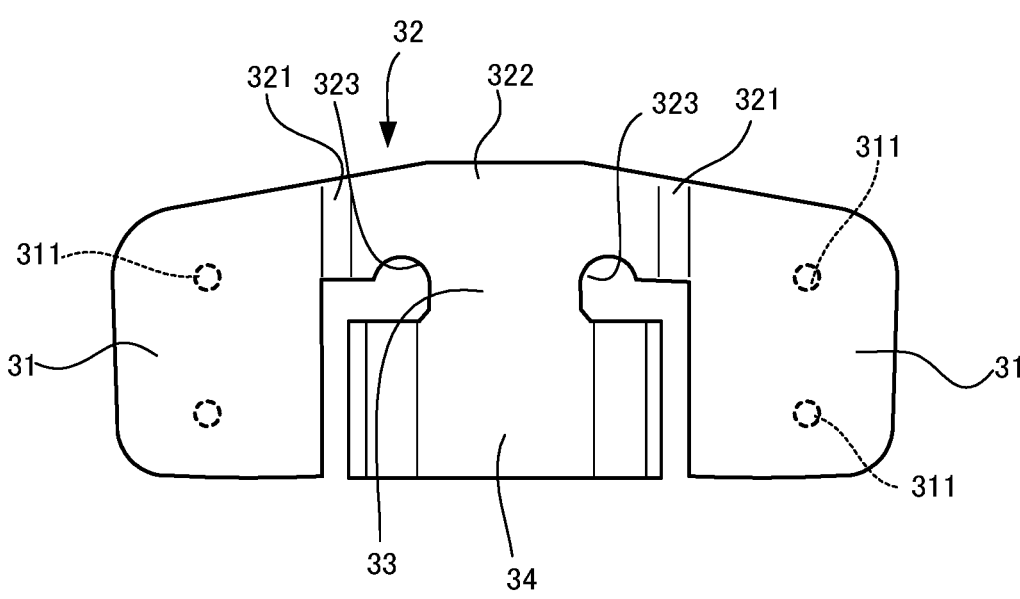
FIG. 10 is a plan view showing another example of a connection terminal according to the present invention.

3. In the above embodiment, two installation portions 31 are provided, but for example, one installation portion 31 may be provided as shown in FIG. 9. In addition, the shape of the base portion 32 is not particularly limited, and any shape that enables the installation portions 31 and the connection portion 33 to be coupled may be adopted. In addition, the power supply portion 34 is provided to be positioned below the main body portion 322 of the base portion 32 when the cable 5 is crimped, but may also be disposed above the main body portion 322. Furthermore, the shape of the installation portions 31 is not particularly limited either, and, for example, as shown in FIG. 10, the installation portions 31 may also be formed in a rectangular shape. With such a configuration, for example, it is possible to increase an area in which the lead-free solder 4 is applied compared to the example in FIG. 3, and thus the joining strength can be improved. In particular, the joining strength of indium-based solder under high temperature (for example, 105 to 120° C.) is not very high, and thus such a configuration is advantageous. In addition, the protrusions 311 do not necessarily need to be provided. If two installation portions 31 are provided, the two installation portions 31 do not need to be provided so as to sandwich the base portion 32 as in the above embodiment, and the positions of the two installation portions 31 relative to the base portion 32 are not particularly limited.

Figure 11:
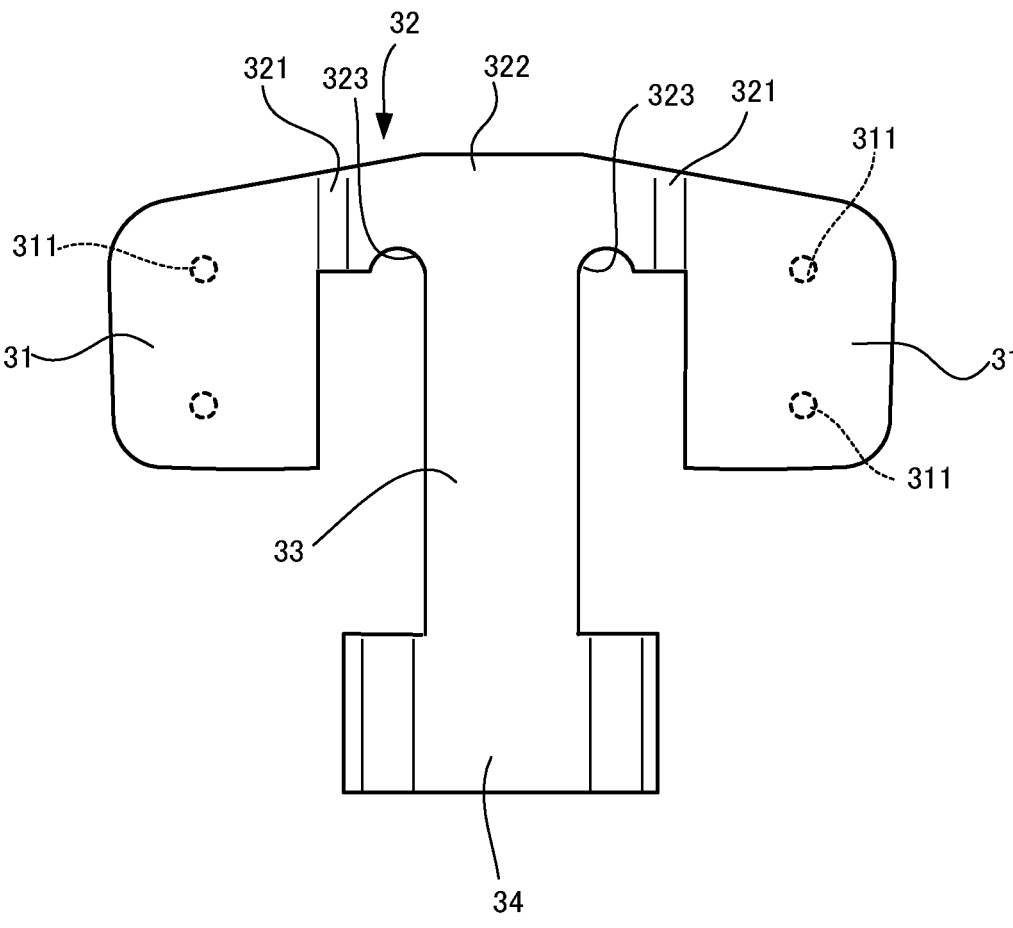
FIG. 11 is a plan view showing another example of a connection terminal according to the present invention.
Figure 12A:
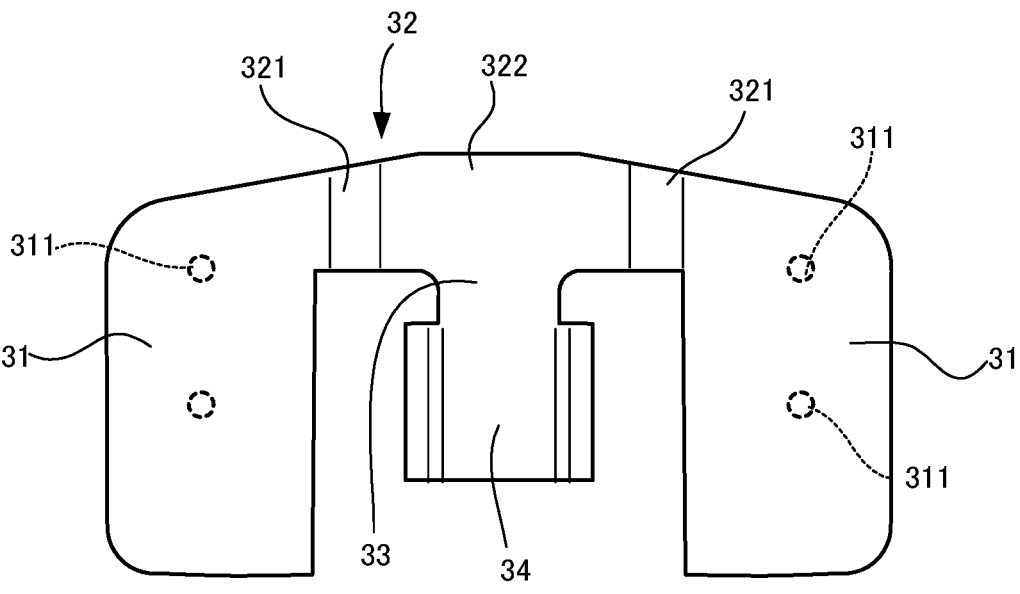
FIG. 12A is a plan view showing another example of a connection terminal according to the present invention.

4. The length of the connection portion 33 is not particularly limited, and, as shown in FIG. 11, the connection portion 33 may extend forward beyond the installation portions 31, for example. Thus, the power supply portion 34 is disposed forward of the installation portions 31. If the connection portion 33 is made longer in this manner, the connection portion 33 bends more easily, and thus it is possible to further suppress concentration of a force on the installation portions 31 when the cable 5 rotates together with the power supply portion 34 as in FIG. 7. On the other hand, it is also possible to change the position of the power supply portion 34 in the front-rear direction by adjusting the lengths of the connection portion 33, the installation portions 31, and the power supply portion 34 in front-rear direction. For example, in the example in FIG. 3, the front end of the power supply portion 34 and the front ends of installation portions 331 generally coincide, but the power supply portion 34 may be disposed rearward of the front ends of the installation portions 31, as shown in FIG. 12A. In addition, the notches 323 are not necessarily required, and, for example, a configuration may also be adopted in which no notches are provided as shown in FIG. 12A. Note that, in this case, it is desirable that the width of the connection portion 33 is made smaller in order to make the connection portion 33 bend easily.

Figure 12B:
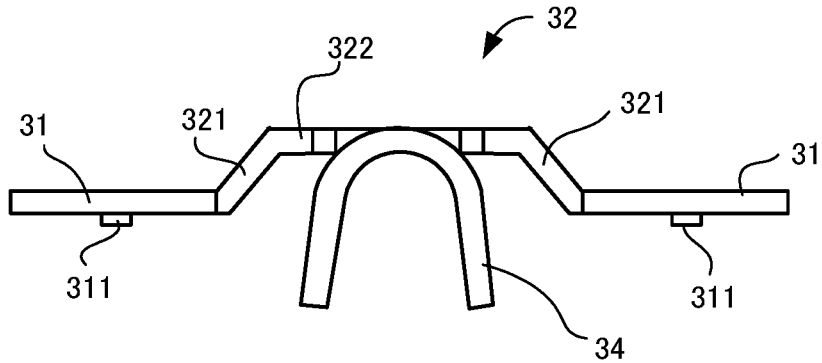
FIG. 12B is a rear view of FIG. 23A.
Figure 13:
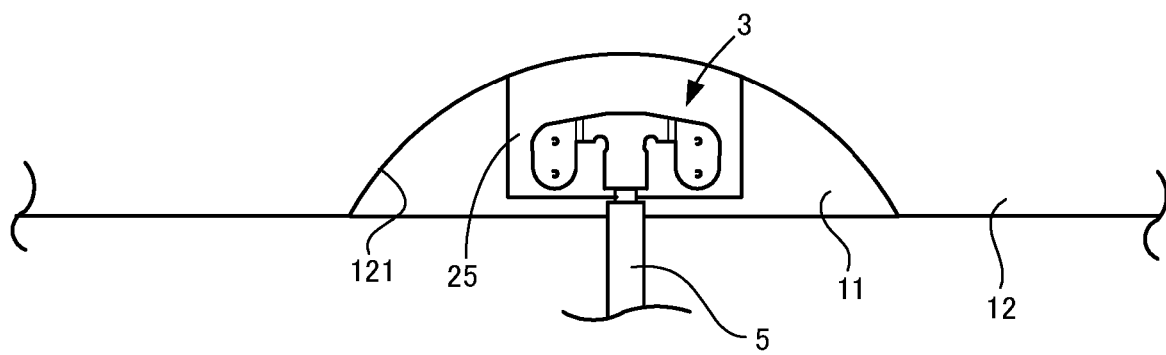
FIG. 13 is a plan view showing a state where a connection terminal according to the present invention is attached to a laminated glass.

5. In the above embodiment, for example, as shown in FIG. 4, the standing portions 321 are provided to be generally perpendicular to the installation portions 31 and the base portion 32, but there is no limitation thereto. As shown in FIG. 12B, for example, the standing portions 321 may extend obliquely relative to the installation portions 31 and the base portion 32. In this example, each standing portion 321 is formed to extend downward as the standing portion 321 moves closer to the installation portion 31 side. Accordingly, when a force acts on the power supply portion 34, it is possible to mitigate the force that is transmitted to the installation portions 31, due to the standing portions 321 extending obliquely.

6. The power supply portion 34 fixes the cable 5 by crimping, but the configuration thereof is not particularly limited as long as the cable 5 can be fixed, and various fixing methods can be applied. For example, the cable 5 and the power supply portion 34 can also be fixed to each other by attaching a connector to a leading end of the cable 5 and fitting the connector in the power supply portion 34, or using solder or an electrically conductive adhesive. In addition, if there is no restriction on the protruding length of the connection terminal 3 from the glass plate 1, the cable 5 can also be fixed to the upper surface side of the connection portion 33.

7. In the above embodiment, an example was described in which the connection terminals 3 are fixed to the defogger 2, but apart from a defogger, any electrical component to which an electric current is supplied can be applied as an electrical conductor of the present invention. For example, a heating wire other than a busbar, or an antenna may also be applied.

8. In the above embodiment, an example was described in which electrical conductors (busbars and heating wire) are provided on the glass plate 1, but, for example, a configuration can also be adopted in which electrical conductors are provided on laminated glass, and the connection terminals 3 are provided thereon. Known laminated glass that includes an outer glass plate, an inner glass plate, an intermediate film made of a resin and disposed between the outer glass plate and the inner glass plate can be used as the laminated glass. Moreover, an electrical conductor such as a heating wire, an antenna, a light control body, or a light emitting body can be disposed on the surface of the inner glass plate on the automobile interior side, and a connection terminal can be fixed to this electrical conductor using lead-free solder. Other than that, for example, a heating wire or the like that is provided in a region in which a sensor or a camera is disposed can be used as an electrical conductor. Alternatively, as shown in FIG. 10, an electrical conductor 25 such as any of the above-described various electrical conductors can be disposed between glass plates 11 and 12, and the electrical conductor 25 can be exposed from a notch 121 formed in the inner glass plate 12. The connection terminal 3 can then be fixed to the exposed electrical conductor 25 using the lead-free solder 4. In this case, the outer glass plate 11 can be formed of non-tempered glass. A de-icer can also be used as such an electrical conductor disposed between the glass plates 11 and 12. In this case, the de-icer can be disposed on the surface of the outer glass plate 11 on the automobile interior side.

9. In addition, a configuration can also be adopted in which a flux is applied to the electrical conductors, and the connection terminals 3 are fixed thereon via the lead-free solder 4. In this case, for example, Gammalux (manufactured by Senju Metal Industry Co., Ltd.) can be used as the flux.

WORKING EXAMPLES

Working examples of the present invention will be described below. However, the present invention is not limited to the following working examples.

1. Preparation of Working Examples and Comparative Example

Figure 14:
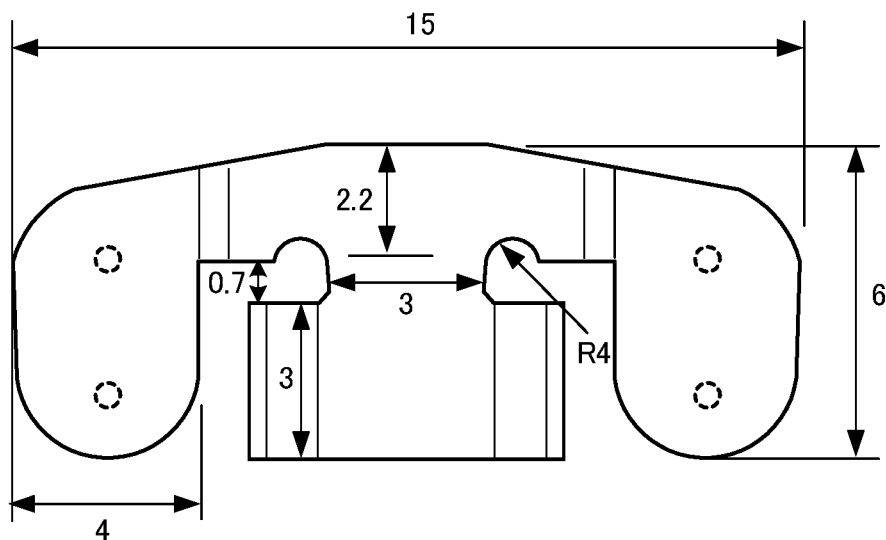
FIG. 14 is a plan view of a connection terminal according to Working Example 1.
Figure 15:
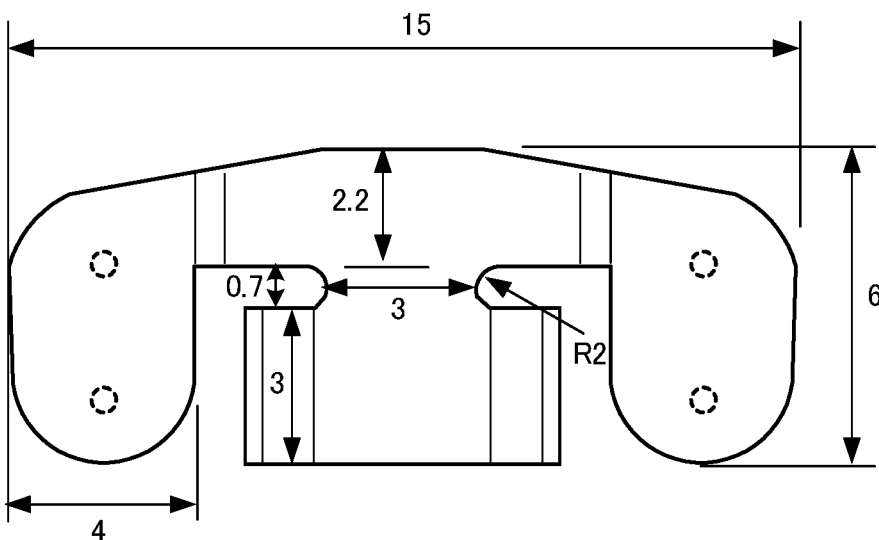
FIG. 15 is a plan view of a connection terminal according to Working Example 2.
Figure 16:
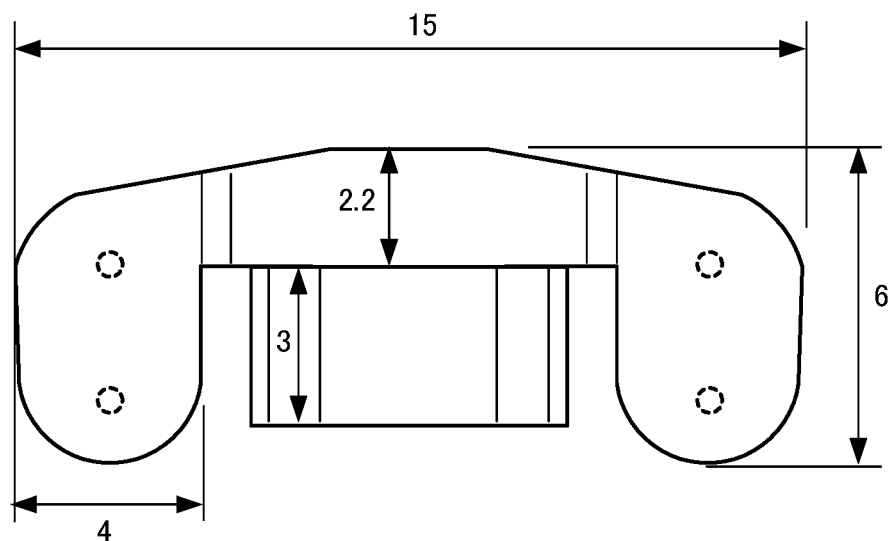
FIG. 16 is a plan view of a connection terminal according to a comparative example.

A connection terminal having the same form as that of the above-described embodiment was produced as Working Example 1. Specifically, a connection terminal shown in FIG. 14 was produced. The material of the connection terminal was copper-zinc alloy, and the dimensions of the connection terminal are as shown in FIG. 14 (the unit is mm). Working Example 2 is shown in FIG. 15, and is different from Working Example 1 in the configuration of the connection portion. That is to say, a connection portion was formed such that the two sides thereof are recessed in a circular-arc shape without notches being provided in the base portion thereof. On the other hand, a connection terminal shown in FIG. 16 was produced as a comparative example. In the comparative example, no connection portion is provided, and a base portion and a power supply portion are directly connected.

Figure 17:
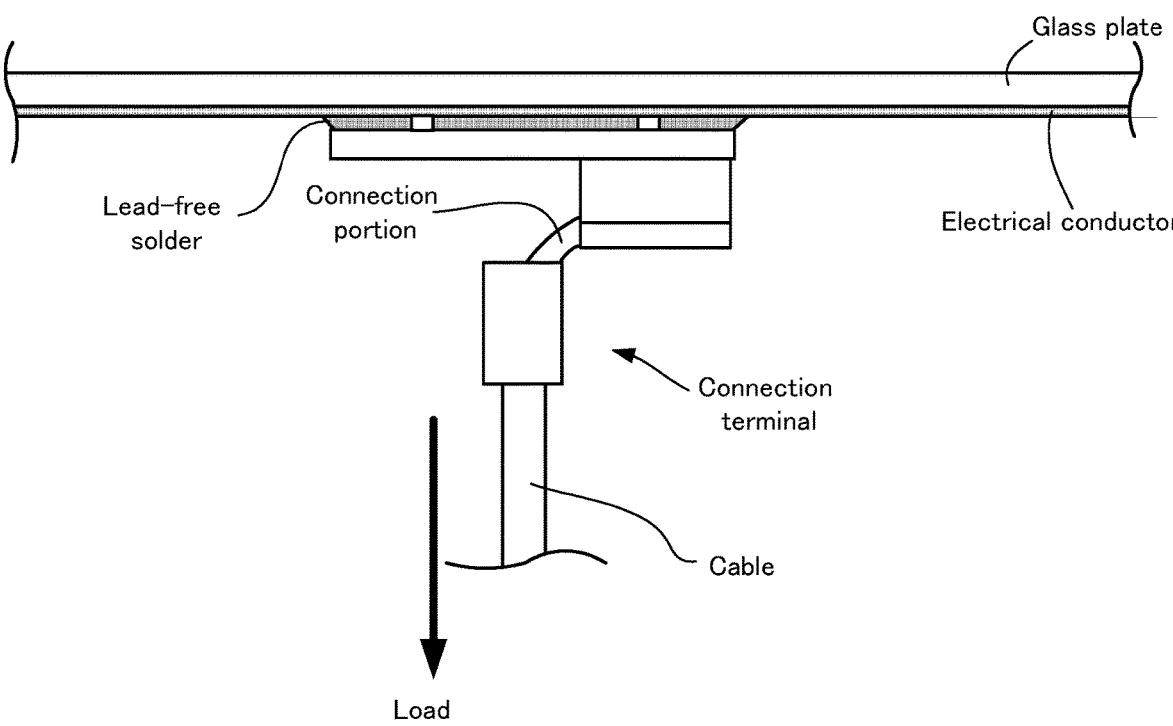
FIG. 17 is a side view showing a test in which a cable is caused to exert a load on the connection terminal according to Working Example 1 or 2.
Figure 18:
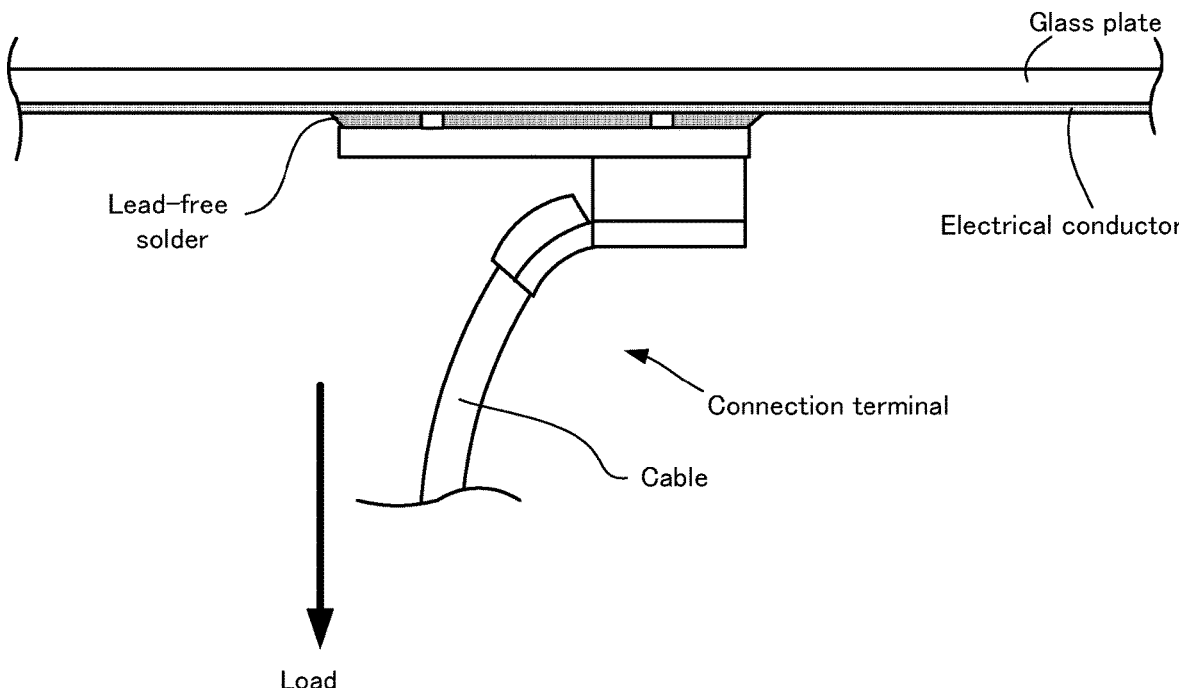
FIG. 18 is a side view showing a test in which a cable is caused to exert a load on the connection terminal according to the comparative example.

Next, a cable was crimped in each of the power supply portions of Working Examples 1 and 2 and the comparative example configured as described above, and the installation portions thereof were fixed to an electrical conductor (material is Ag) laminated on a glass plate (non-tempered glass plate: thickness 2.0 mm), using indium-based lead-free solder. Then, as shown in FIG. 17 or 18, the glass plate was disposed such that the connection terminal was facing downward, a load was applied to the cable in a direction perpendicular to the glass plate, and Working Examples 1 and 2 and the comparative example were stored for 96 hours in a storage chamber at a temperature of 105° C. Subsequently, it was observed whether or not the connection terminals were detached from the electrical conductors. Two types of loads, namely 5 N and 10 N were applied. The results are as follows.

TABLE 1

|  | 5N | 10N |
| --- | --- | --- |
| Working Example 1 | Not detached | Not etached |
| Working Example 2 | Not detached | Not detached |
| Comparitive example | Detached | Detached |

As shown in the above table 1, the connection terminals according to Working Examples 1 and 2 were not detached from the electrical conductors, but the connection terminal according to the comparative example was detached from the electrical conductor. Each of the connection terminals according to Working Examples 1 and 2 had a connection portion, and thus, when a load that was perpendicular to the glass plate was exerted on the cable, the connection portion bent as shown in FIG. 17. Therefore, it is thought that the action of the moment of rotation, caused by the load acting on the cable, on the installation portions of the connection terminal was mitigated, and accordingly the connection terminal was prevented from being detached. On the other hand, it is thought that the connection terminal according to the comparative example had no connection portion, and thus, when a load that was perpendicular to the glass plate was applied to the cable, the moment of rotation caused by the cable acted greatly on the installation portions as shown in FIG. 18, and thus the installation portions were detached from the electrical conductor. Therefore, it was found that a connection terminal can be prevented from being detached, by providing a connection portion between the base portion and the power supply portion.

LIST OF REFERENCE NUMERALS

1 Glass plate
2 Defogger (conductive layer)
3 Connection terminal
4 Lead-free solder
5 Cable
10 Glass plate module
31 Installation portion
32 Base portion
33 Connection portion
34 Power supply portion

The invention claimed is:
1. A glass plate module comprising:
a glass body;
an electrical conductor laminated on the glass body;
at least one connection terminal fixed to the electrical conductor, and formed of a conductive material; and
a lead-free solder for fixing the connection terminal to the electrical conductor,

wherein the connection terminal includes:

a base portion;

a pair of installation portions coupled to the base portion, and fixed to the electrical conductor via the lead-free solder;

a power supply portion to be connected to a cable for supplying power to the electrical conductor; and a connection portion that is disposed between the base portion and the power supply portion, and that connects the power supply portion to the base portion in a bendable manner, the base portion includes a pair of standing portions standing from the installation portions, and a main body portion that extends in a horizontal first direction so as to connect the standing portions, the power supply portion is connected to the main body portion via the connection portion and extends in a horizontal second direction orthogonal to the horizontal first direction, the pair of installation portions are disposed on two sides of the power supply portion so as to sandwich the power supply portion, notches are formed in portions of the base portion that are connected to the connection portion, the power supply portion includes a supporting portion connected to the connection portion and a pair of extending portions extending from two sides of the supporting portion, and the extending portions are configured to fix the cable for supplying power by crimping the extending portions to the cable.

2. The glass plate module according to claim 1, wherein the pair of installation portions are disposed on opposite sides to each other to sandwich the base portion.

3. The glass plate module according to claim 1, wherein the connection portion is configured to be more deformable than the base portion.

4. The glass plate module according to claim 1, wherein the connection portion is formed of copper-zinc alloy.

5. The glass plate module according to claim 1, wherein at least one protrusion is formed on a surface of at least one of the installation portions that is opposed to the electrical conductor via the lead-free solder.

6. The glass plate module according to claim 1, wherein the electrical conductor is formed by at least one heating wire.

7. The glass plate module according to claim 1, wherein the electrical conductor is formed by at least one antenna.

8. The glass plate module according to claim 1, wherein the electrical conductor is formed by at least one light control body or light emitting body.

9. The glass plate module according to claim 1, wherein the glass body is formed of laminated glass that includes:

an outer glass plate;

an inner glass plate; and an intermediate film disposed between the outer glass plate and the inner glass plate.

10. The glass plate module according to claim 9, wherein the electrical conductor is disposed between the outer glass plate and the inner glass plate, a notch is formed on an end edge of the inner glass plate, and the connection terminal is fixed, via the lead-free solder, to the electrical conductor that is exposed to an outside due to the notch.

11. The glass plate module according to claim 10 wherein the outer glass plate is formed of non-tempered glass.

12. The glass plate module according to claim 1, wherein the electrical conductor is formed of printed silver.

13. The glass plate module according to claim 1, wherein the lead-free solder is a lead-free indium-based solder.

14. The glass plate module according to claim 1, wherein a melting point of the lead-free solder is 150° C. or lower.

15. The glass plate module according to claim 1, wherein the extending portions are disposed between the supporting portion and the electrical conductor.

* * * * *